(No Model.)
J. DARBY.
HYDROCARBON BURNER.
No. 552,237. Patented Dec. 31, 1895.
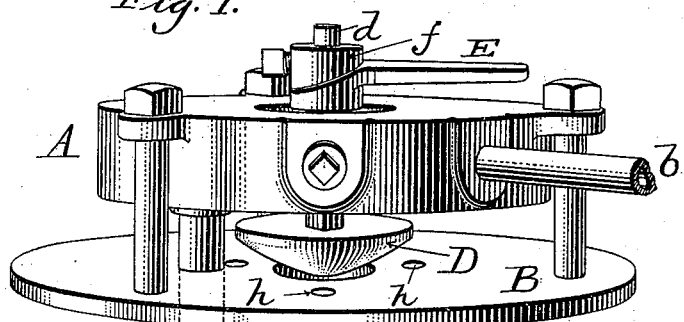
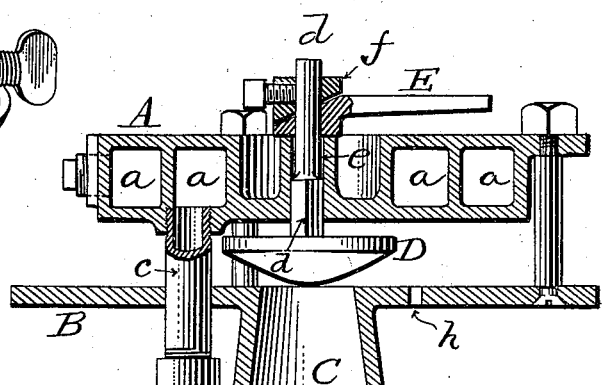
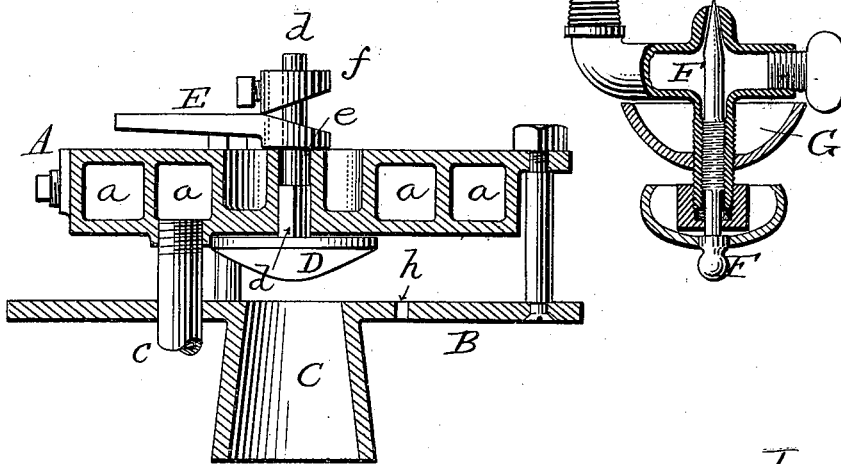
Attest
cell Burdine.
C. B. Bull.
Inventor
Joseph Darby
By Dodge & Sons,
Attys.

United States Patent Office.

JOSEPH DARBY, OF SPRINGFIELD, OHIO; HARMON S. FAIRCHILD, ADMINISTRATOR OF SAID DARBY, DECEASED, ASSIGNORS TO ELIJAH F. DARBY, OF SAME PLACE.

HYDROCARBON-BURNER.

SPECIFICATION forming part of Letters Patent No. 552,237, dated December 31, 1895.

Application filed December 28, 1894. Renewed November 29, 1895. Serial No. 570,540. (No model.)

*To all whom it may concern:*

Be it known that I, JOSEPH DARBY, a citizen of the United States, residing at Springfield, in the county of Clark and State of Ohio, have invented certain new and useful Improvements in Hydrocarbon - Burners, of which the following is a specification.

My invention relates to hydrocarbon-burners; and it consists of the novel construction hereinafter set forth and claimed.

In the drawings, Figure 1 is a perspective view of my improved burner; Fig. 2, a vertical sectional view; and Fig. 3, a similar view of a portion of the burner, the parts being in a different adjusted position.

The object of my invention, aside from producing a cheap and safe burner, is to prevent the roaring sound incident to most burners, and also to provide means whereby the intensity of the flame may be easily regulated.

A designates the retort, provided with the usual tortuous passage $a$, the inlet-pipe $b$, and the outlet-pipe $c$. Below the retort I secure a plate or disk B, provided at its center with a depending conical mixer or funnel C, the walls converging upwardly or toward the discharge end. Between this plate and the retort and over the mouth of the mixer there is suspended a deflector or spreader D, the stem $d$ of which passes up through a square opening $e$ in the retort. The lower portion of the stem is square, and it is thus prevented from turning. Adjustably attached to the upper end of the stem is a cam-faced washer $f$, while below it and encircling the stem is a handle E, also provided with a cam-face, which takes against the similar face on the washer. By turning this handle the deflector or spreader will be raised or lowered, it being shown in its lowest position in Figs. 1 and 2 and in its elevated position in Fig. 3.

F indicates the valve, the needle-point $g$ of which is made tapering and extended out beyond the valve-seat, as will be seen upon reference to Figs. 1 and 2. This construction insures the easy regulation of the flow of the gas and also aids in keeping the exit clear of any obstruction, for when the valve is closed foreign matters will be forced out of the way. Between the handle of the valve and the exit I provide a cup G, which is used as a primary combustion-chamber to start the burner. A series of holes or openings $h$ is provided around the mixing-funnel to admit air to the space between the retort and the plate B to provide for the proper combustion of the gas or vapor.

The operation of the burner is as follows: Oil is admitted to the retort and passes down to the valve, which is opened slightly to allow the oil to flow out and down into the cup G, where it is ignited. In the meantime the spreader or deflector has been raised to its highest position, as shown in Fig. 3, to admit of the flames having a free passage through the mixing-funnel and to allow them to come into direct contact with the retort. The oil in the retort becomes vaporized and is ejected from the valve into the mixing chamber or funnel where it intermingles with the air, and as it issues into the space below the retort it ignites. If not enough air is taken up in the funnel, then the air passing in through the openings $h$ supplies the deficiency. When the retort becomes thoroughly heated, the spreader or deflector is lowered. This affects the burner in several particulars. First, it retards the passage of the gas through the funnel or mixer, and in so doing does away with any and all roaring sound which may arise and insures complete combustion, and, secondly, it protects the base of the retort from the direct action of the flame, an object much to be desired. The intensity of the flame I find may be easily regulated through the medium of this spreader without changing the regulation of the valve.

Having thus described my invention, what I claim is—

1. In a hydro-carbon burner, the combination of a retort; a plate or disk below said retort provided with a mixing funnel; and a retarder or spreader adjustably secured to the retort over the mixing funnel in the space formed between the bottom face of the retort and the plate.

2. In a hydro-carbon burner, the combination of a retort; a plate or disk below said retort provided with a mixing funnel; a retarder or spreader adjustably secured to the retort over the mixing funnel in the space formed between the bottom face of the retort and the plate; and means for adjusting the spreader toward and from the mouth of the funnel.

3. In a hydro-carbon burner, the combination of a retort; a plate or disk below said retort provided with a depending mixing funnel or chamber; an adjustable retarder or spreader secured to the retort over the mixing chamber in the space formed between the bottom face of the retort and the plate; a valve below the mixing funnel; and a cup below the valve exit.

4. In a hydro-carbon burner, the combination of a retort; a plate or disk below said retort provided with a depending mixing funnel or chamber; and a series of openings through the plate around the mixing funnel; an adjustable spreader or retarder secured to the retort over the mixing funnel; a valve located below the funnel, and a cup below the valve exit.

5. In a hydro-carbon burner, the combination of a retort having a central opening; a retarder or spreader having a stem passing up through said opening; means for adjusting the position of the spreader relative to the retort; a plate or disk located below the spreader and retort, and provided with a mixing funnel, and a series of openings around the mouth of said funnel; a valve below the funnel, and a cup below the valve exit.

6. In a hydro-carbon burner, the combination of a retort; a plate or disk below said retort provided with a depending mixing funnel or chamber, and a series of openings through the plate around the mixing funnel; and an adjustable spreader or retarder secured to the retort over the mixing funnel in the space between the bottom face of the retort and the plate.

In witness whereof I hereunto set my hand in the presence of two witnesses.

JOSEPH DARBY.

Witnesses:
W. S. B. RANDALL,
CHAS. A. COLES.